(12) United States Patent
Katayama et al.

(10) Patent No.: US 7,755,247 B2
(45) Date of Patent: Jul. 13, 2010

(54) MOTOR

(75) Inventors: Hidekazu Katayama, Chiyoda-ku (JP); Daisuke Togo, Chiyoda-ku (JP); Noboru Uemori, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 281 days.

(21) Appl. No.: 12/000,248

(22) Filed: Dec. 11, 2007

(65) Prior Publication Data

US 2008/0309182 A1    Dec. 18, 2008

(30) Foreign Application Priority Data

Jun. 13, 2007    (JP) .............................. 2007-156617

(51) Int. Cl.
 *H02K 5/14* (2006.01)
(52) U.S. Cl. ....................... 310/239; 310/242
(58) Field of Classification Search .................. 310/239, 310/242
See application file for complete search history.

(56) References Cited

U.S. PATENT DOCUMENTS 5,039,898 A * 8/1991 Shiina ........................ 310/239
5,744,890 A * 4/1998 Yamaguchi et al. .......... 310/248
7,109,628 B2 * 9/2006 Yamamoto et al. ........... 310/239
2006/0226730 A1 * 10/2006 Fulton ........................ 310/239

FOREIGN PATENT DOCUMENTS

| JP | 59-15237 A | 1/1984 |
| JP | 05-219676 A | 8/1993 |
| JP | 2829182 B2 | 9/1998 |
| JP | 2001-352720 A | 12/2001 |
| WO | WO 98-054821 A1 | 12/1998 |

* cited by examiner

*Primary Examiner*—Burton Mullins
(74) *Attorney, Agent, or Firm*—Sughrue Mion, PLLC

(57) ABSTRACT

A motor which, even if the commutator is deformed, suppresses brush deformation to thereby prevent short-circuiting between the positive-pole-side brush and the motor housing. A motor includes: a motor housing; a stator; a rotor; a commutator; a positive-pole-side brush; a negative-pole-side brush; and a brush holding frame fixed to the motor housing and having a positive-pole-side brush holding portion holding the positive-pole-side brush and a negative-pole-side brush holding portion holding the negative-pole-side brush, in which the positive-pole-side brush holding portion and the negative-pole-side brush holding portion each curve about a circumference of the commutator, and in which a thickness of an outer portion of the positive-pole-side brush holding portion in a circumferential direction of the commutator is greater than a thickness of an outer portion of the negative-pole-side brush holding portion in the circumferential direction of the commutator.

5 Claims, 4 Drawing Sheets (a)

(b)

MOTOR

BACKGROUND OF THE INVENTION

1. Field of the Invention

The present invention relates to a motor equipped with a motor housing, a brush provided in the motor housing, and a brush holding frame holding the brush.

2. Description of the Related Art

A conventionally known motor for an engine starter is equipped with a motor housing, a stator fixed in position on an inner side of the motor housing, a rotor rotatably provided on an inner side of the stator, a commutator provided on a rotation shaft of the rotor and rotating together with the rotor, a brush one end portion of which is brought into contact with the commutator and the other end portion of which is connected to a lead wire, and an insulating brush holding frame fixed in position on the inner side of the motor housing and holding the brush (see, for example, JP 2829182 B).

The brush is constituted by a positive-pole-side brush connected to a positive-pole-side lead wire and a negative-pole-side brush connected to a negative-pole-side lead wire. The brush holding frame has a positive-pole-side brush holding portion holding the positive-pole-side brush within and a negative-pole-side brush holding portion holding the negative-pole-side brush within. The positive-pole-side brush holding portion is formed in substantially the same thickness as the negative-pole-side brush holding portion, and insulates the positive-pole-side brush from the motor housing.

In this conventional motor, however, the commutator attains high temperature through energization for a long period of time. When the strength of the commutator deteriorates and the rotating commutator undergoes radial outward deformation, the commutator collides with the brush holding frame, resulting in deformation of the positive-pole-side brush holding portion and of the negative-pole-side brush holding portion. In particular, when the positive-pole-side brush holding portion is deformed, the positive-pole-side brush sticks out of the positive-pole-side brush holding portion, so there is a fear of short-circuiting between the positive-pole-side brush and the motor housing.

SUMMARY OF THE INVENTION

The present invention has been made with a view toward solving the above problem in the prior art. It is an object of the present invention to provide a motor which can suppress deformation of the positive-pole-side brush holding portion even if the commutator is deformed to collide with the brush holding frame, thus preventing short-circuiting between the positive-pole-side brush and the motor housing.

A motor according to the present invention includes: a motor housing having a cover portion and a cylindrical motor housing main body; a stator fixed in position on an inner side of the motor housing; a rotor rotatably provided on an inner side of the stator; a commutator provided on a rotation shaft of the rotor and rotating together with the rotor; a positive-pole-side brush one end portion of which is in contact with the commutator and another end portion of which is connected to a positive-pole-side lead wire; a negative-pole-side brush one end portion of which is in contact with the commutator and another end portion of which is connected to a negative-pole-side lead wire; and an insulating brush holding frame fixed in position on the inner side of the motor housing and having a positive-pole-side brush holding portion holding the positive-pole-side brush and a negative-pole-side brush holding portion holding the negative-pole-side brush, wherein the positive-pole-side brush holding portion and the negative-pole-side brush holding portion each curve about a circumference of the commutator; and wherein a thickness of an outer portion of the positive-pole-side brush holding portion in a circumferential direction of the commutator is greater than a thickness of an outer portion of the negative-pole-side brush holding portion in the circumferential direction of the commutator.

According to the motor of the present invention, even if the commutator is deformed to collide with the brush holding frame, it is possible to suppress deformation of the positive-pole-side brush holding portion, thereby preventing short-circuiting between the positive-pole-side brush and the motor housing.

DETAILED DESCRIPTION OF THE PREFERRED EMBODIMENTS

In the following, embodiments of the present invention will be described with reference to the drawings, in which the same or equivalent members or portions are indicated by the same reference symbols.

Embodiment 1

Figure 1:
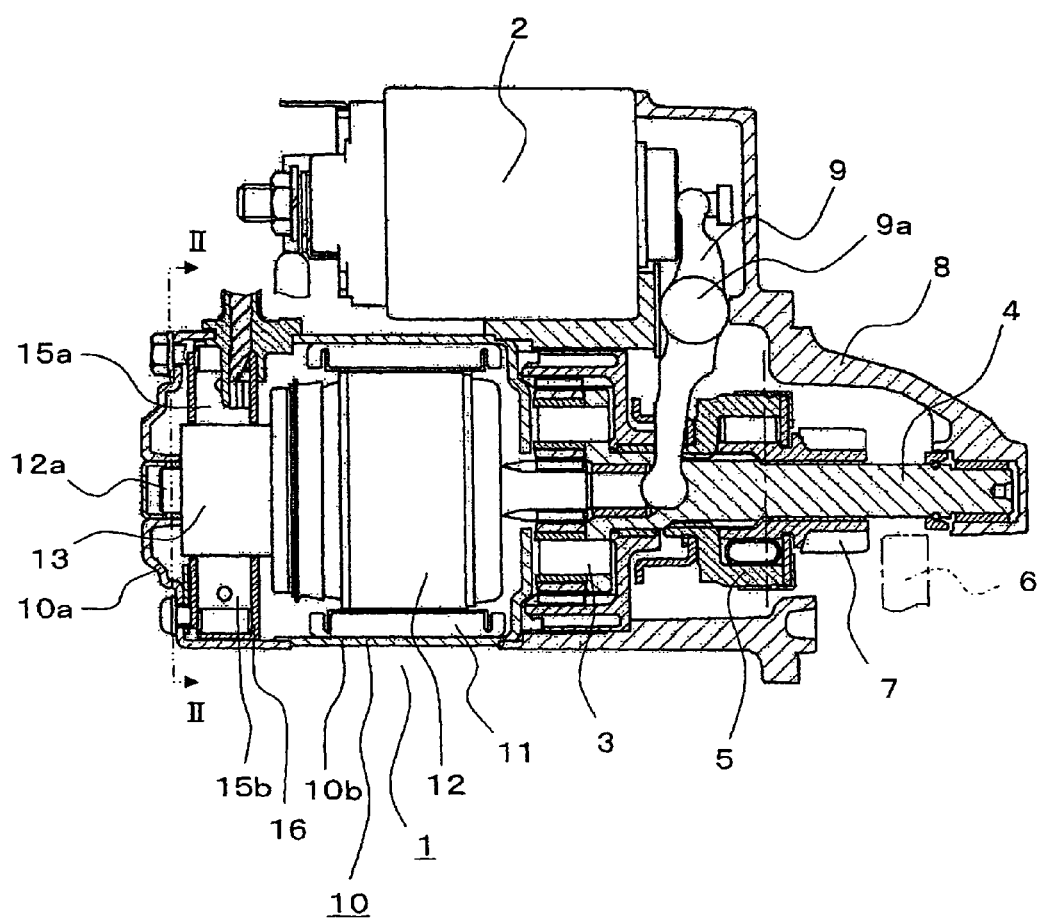
FIG. 1 is a general sectional view of a motor according to Embodiment 1.
Figure 2:
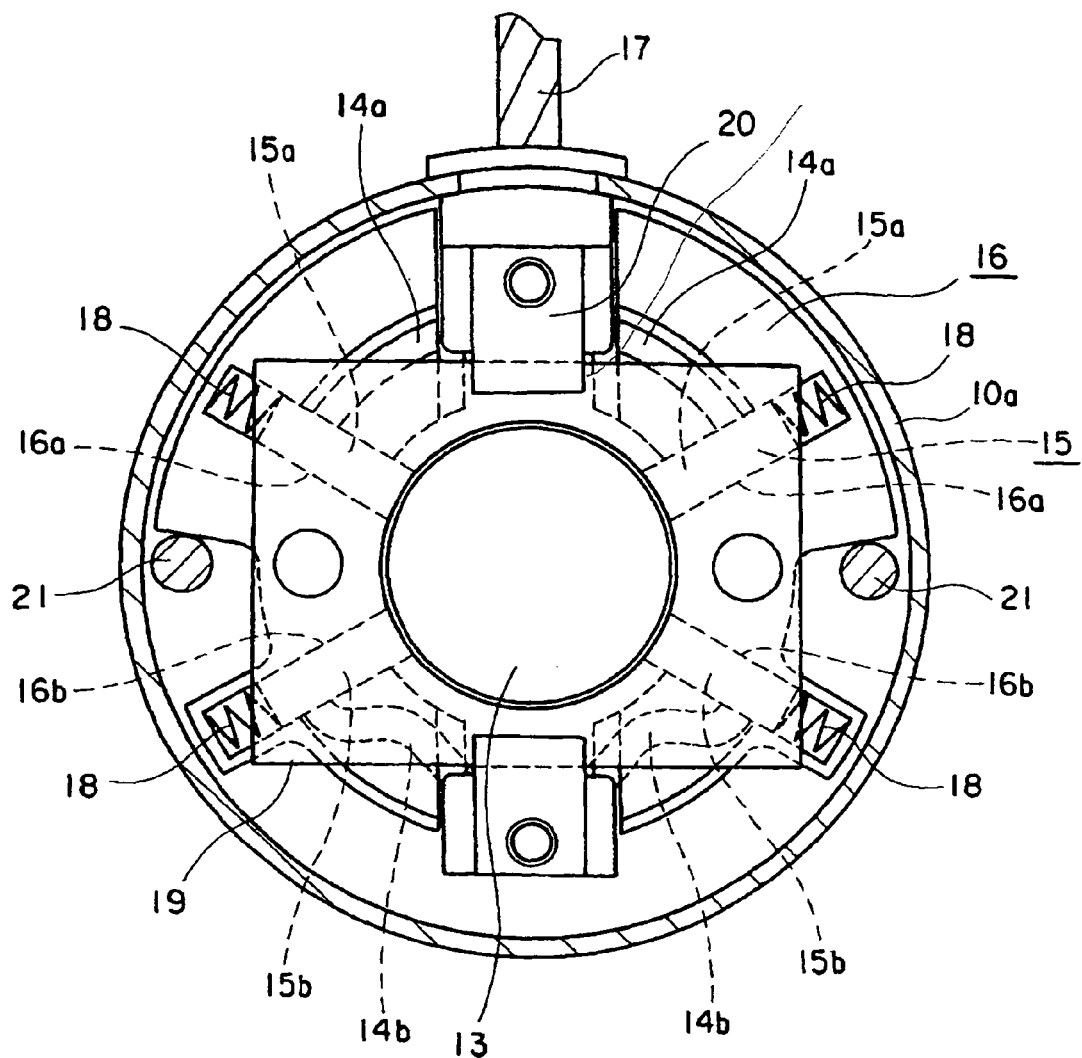
FIG. 2 is a sectional view taken along the arrow line II-II of FIG. 1.

FIG. 1 is a general sectional view of an engine starter to which a motor 1 according to Embodiment 1 of the present invention is mounted, and FIG. 2 is a sectional view taken along the line II-II of FIG. 1.

The engine starter is equipped with a motor 1, a switch 2 for turning on/off the energization of the motor 1 through operation of a key switch (not shown), an output shaft 4 which is provided on a rotation shaft 12a described below of the motor 1 through the intermediation of a speed reduction portion 3 and through which torque from the rotation shaft 12a is transmitted, a clutch 5 provided on the output shaft 4 and slidable in the axial direction, a pinion gear 7 which is provided on the clutch 5 and which can be brought into mesh with a ring gear 6 of the engine, and a housing 8 covering the output shaft 4, the clutch 5, and the pinion gear 7.

The switch 2 is provided with a shift lever 9 rotatable around a rotation shaft 9a; through operation of the switch 2, the shift lever 9 rotates, and the clutch 5 slides along the output shaft 4.

The motor 1 is equipped with a motor housing 10 having a rear bracket 10a constituting a cover portion and a cylindrical motor housing main body 10b, a stator 11 fixed in position within the interior of the motor housing 10 and having a permanent magnet, a rotor 12 rotatably provided on the inner side of the stator 11, and a commutator 13 provided on a rotation shaft 12a of the rotor 12 and rotating together with the rotor 12.

Further, the motor 1 is equipped with a positive-pole-side brush 15a one end portion of which is in contact with the commutator 13 and the other end portion of which is connected to a positive-pole-side lead wire 14a, a negative-pole-side brush 15b one end portion of which is in contact with the commutator 13 and the other end portion of which is connected to a negative-pole-side lead wire 14b, and a brush holding frame 16 formed of phenol resin and having a positive-pole-side brush holding portion 16a provided on the inner side of the motor housing 10 and holding the positive-pole-side brush 15a, and a negative-pole-side brush holding portion 16b holding the negative-pole-side brush 15b.

The material of the brush holding frame 16 is not restricted to phenol resin; it may also be some other insulating material.

There are provided two positive-pole-side brushes 15a and two negative-pole-side brushes 15b; the two positive-pole-side brushes 15a are opposed to each other, and the two negative-pole-side brushes 15b are also opposed to each other, with each brush being arranged to extend radially.

There are provided two positive-pole-side brush holding portions 16a and two negative-pole-side brush holding portions 16b so that they may respectively hold the positive-pole-side brushes 15a and the negative-pole-side brushes 15b.

The positive-pole-side lead wires 14a are connected to a motor lead wire 17, making it possible to supply electricity to the positive-pole-side lead wires 14a from the outside.

Inside the positive-pole-side brush holding portions 16a, there are provided springs 18 pressurizing the positive-pole-side brushes 15a toward the commutator 13, thereby reliably holding the positive-pole-side brushes 15a in contact with the commutator 13.

Also inside the negative-pole-side brush holding portions 16b, there are provided springs 18 pressurizing the negative-pole-side brushes 15b toward the commutator 13, thereby reliably holding the negative-pole-side brushes 15b in contact with the commutator 13.

On the side of the brush holding frame 16 opposite to the rotor 12, there is provided an insulating cover plate 19 for confining the positive-pole-side brushes 15a in the positive-pole-side brush holding portions 16a and the negative-pole-side brushes 15b in the negative-pole-side brush holding portions 16b.

Due to the insulating cover plate 19, the positive-pole-side lead wires 14a and the negative-pole-side lead wires 14b are also confined within the brush holding frame 16.

At a circumferential middle portion between the two positive-pole-side brush holding portions 16a, the brush holding frame 16 has a protrusion protruding radially outwards.

Further, also at a circumferential middle portion between the two negative-pole-side brush holding portions 16b, the brush holding frame 16 has a protrusion protruding radially outwards.

The protrusions of the brush holding frame 16 and the insulating cover plate 19 are fixed in position while held by a mounting member 20.

The mounting member 20 is fixed to the rear bracket 10a by a screw (not shown), so axial movement of the brush holding frame 16 is restricted.

The rear bracket 10a is fixed to the motor housing main body 10b by two through bolts 21 passing through the interior of the motor housing main body 10b; the through bolts 21 are also threaddedly engaged with the housing 8 of the engine starter 8. As a result, the motor 1 is fixed to the housing 8.

The positive-pole-side brush holding portions 16a have a thickness in a circumferential direction of the commutator that is greater than a thickness of the negative-pole-side brush holding portions 16b in the circumferential direction of the commutator, and are in contact with the through bolts 21. As a result, circumferential rotation of the brush holding frame 16 is restricted.

Further, an outer surface of the positive-pole-side brush holding portions 16a, in a radial direction of the commutator 13, is disposed between the positive-pole-side lead wires 14a and the motor housing 10, whereby the positive-pole-side lead wires 14a and the motor housing 10 are prevented from coming into contact with each other.

It is also possible for the positive-pole-side brush holding portions 16a have an increased thickness in the axial direction, thereby enhancing the strength of the positive-pole-side brush holding portions 16a.

As described above, in the motor 1 of Embodiment 1, the positive-pole-side brush holding portions 16a have an increased thickness to be enhanced in strength, so even if the commutator 13 is deformed to collide with the brush holding frame 16, deformation of the positive-pole-side brush holding portions 16a is suppressed, with the result that the positive-pole-side brushes 15a are prevented from sticking out of the positive-pole-side brush holding portions 16a, thereby preventing short-circuiting between the positive-pole-side brushes 15a and the motor housing 10.

Further, a thickness of the positive-pole-side brush holding portions 16a are provided with an increased thickness in a circumferential direction of the commutator 13. Therefore, even if the commutator 13 is deformed to collide with the brush holding frame 16, and the positive-pole-side brush holding portions 16a receive a radial force from the commutator 13, deformation of the positive-pole-side brush holding portions 16a is suppressed. As a result, it is possible to prevent short-circuiting between the positive-pole-side brushes 15a and the motor housing 10.

Further, an outer surface of the positive-pole-side brush holding portions 16a, in a radial direction of the commutator 13, is disposed between the positive-pole-side lead wires 14a and the motor housing 10, so it is possible to prevent short-circuiting between the positive-pole-side lead wires 14a and the motor housing 10.

Further, the through bolts 21 are engaged with the brush holding frame 16 to restrict rotation of the brush holding frame 16 in the circumferential direction, so even if the rotating commutator 13 collides with the brush holding frame 16, rotation of the brush holding frame 16 is suppressed. As a result, it is possible to prevent the positive-pole-side brushes 15a and the positive-pole-side lead wires 14a from sticking out of the brush holding frame 16, thereby making it possible to prevent short-circuiting between the positive-pole-side brushes 15a and the positive-pole-side lead wires 14a and the motor housing 10. Further, it is also possible to prevent short-circuiting between the positive-pole-side brushes 15a and the positive-pole-side lead wires 14a and the through bolts 21.

While in the motor 1 of Embodiment 1 described above the through bolts 21 and the brush holding frame 16 are engaged with each other, this naturally should not be construed restrictively; it is also possible to adopt a motor 1 in which the stator 11 fixed in position inside the motor housing 10 extends toward the brush holding frame 16 to be engaged with the brush holding frame 16.

Further, the embodiment is not restricted to the motor 1 in which the through bolts 21 are engaged with the brush holding frame 16 to restrict circumferential rotation of the brush holding frame 16; the embodiment is also applicable to a motor 1 in which the through bolts 21 are provided with flange portions abutting the end surface of the brush holding frame 16 to restrict circumferential rotation of the brush holding frame 16 and to restrict axial movement of the brush holding frame 16.

Since axial movement of the brush holding frame 16 is restricted, the positive-pole-side brushes 15a and the positive-pole-side lead wires 14a are prevented from sticking out of the brush holding frame 16, making it possible to prevent short-circuiting between the positive-pole-side brushes 15a and the positive-pole-side lead wires 14a and the motor housing 10. Further, it is possible to prevent short-circuiting between the positive-pole-side brushes 15a and the positive-pole-side lead wires 14a and the through bolts 21.

Embodiment 2

Figure 3:
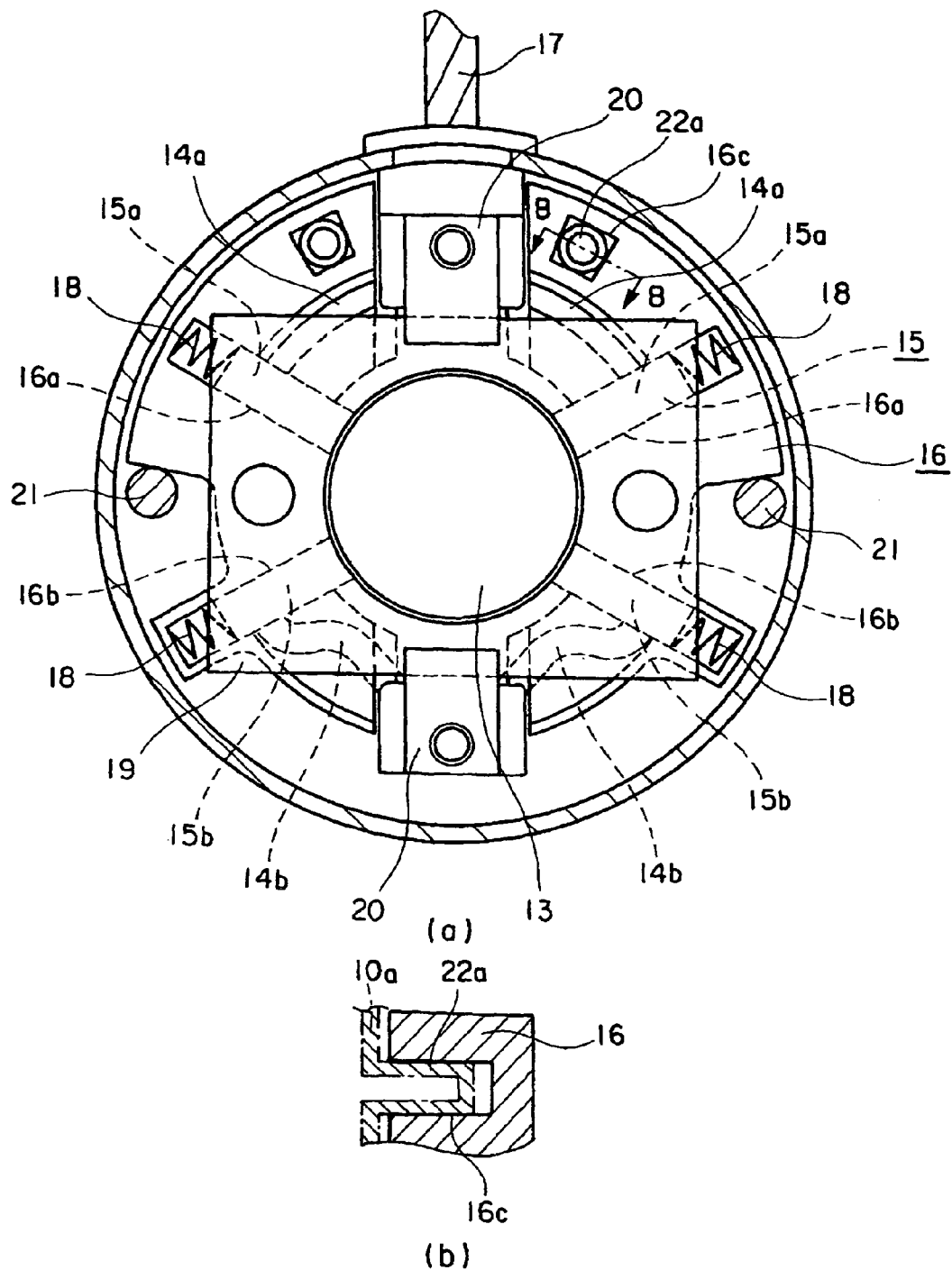
FIG. 3A is a main portion sectional view of a motor according to Embodiment 2.
FIG. 3B is a sectional view taken along the arrow line B-B of FIG. 3A.

FIG. 3A is a main portion sectional view of a motor 1 according to Embodiment 2, and FIG. 3B is a sectional view taken along the arrow line B-B of FIG. 3A.

In the motor 1 of Embodiment 2, there are formed on the rear bracket 10a two protrusions 22a that constitute engagement portions protruding toward the brush holding frame 16.

In the surface of the brush holding frame 16 opposed to the rear bracket 10a and between the positive-pole-side lead wires 14a and the motor housing 10, there are formed axially extending hole portions 16c, which are engaged with the protrusions 22a.

As a result, circumferential rotation of the brush holding frame 16 is restricted.

Otherwise, this embodiment is of the same construction as Embodiment 1.

In the motor 1 of Embodiment 2, the protrusions 22a formed on the rear bracket 10a and the hole portions 16c formed in the brush holding frame 16 are engaged with each other to restrict circumferential rotation of the brush holding frame 16, so even if the rotating commutator 13 collides with the brush holding frame 16, rotation of the brush holding frame 16 is restricted. As a result, the positive-pole-side brushes 15a and the positive-pole-side lead wires 14a are prevented from sticking out of the brush holding frame 16, making it possible to prevent short-circuiting between the positive-pole-side brushes 15a and the positive-pole-side lead wires 14a and the motor housing 10.

The embodiment is not restricted to the motor 1 in which the protrusions 22a are engaged with the hole portions 16c to suppress circumferential rotation of the brush holding frame 16; the embodiment is also applicable to a motor 1 in which the protrusions 22a are provided with flange portions abutting the end surface of the brush holding frame 16 to restrict circumferential rotation of the brush holding frame 16 and to restrict axial movement of the brush holding frame 16.

As a result, even if the commutator 13 collides with the brush holding frame 16, axial movement of the brush holding frame 16 is suppressed, with the result that the positive-pole-side brushes 15a and the positive-pole-side lead wires 14a are prevented from sticking out of the brush holding frame 16. With this construction, it is possible to prevent short-circuiting between the positive-pole-side brushes 15a and the positive-pole-side lead wires 14a and the motor housing 10.

Embodiment 3

Figure 4:
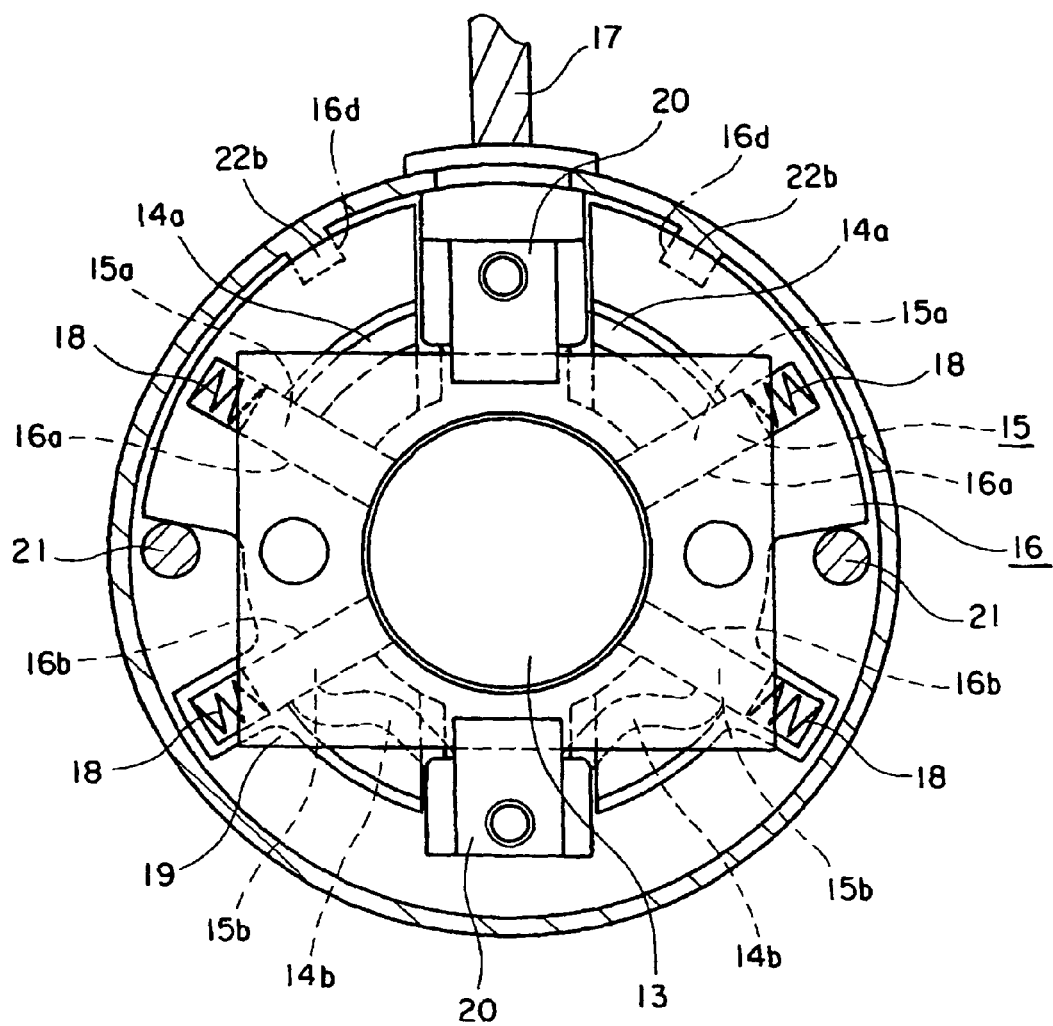
FIG. 4 is a main portion sectional view of a motor according to Embodiment 3.

FIG. 4 is a main portion sectional view of a motor 1 according to Embodiment 3.

In the motor 1 of Embodiment 3, two protrusions 22b, which are engagement portions protruding radially inwards, are formed on the inner peripheral surface of the cylindrical portion of the rear bracket 10a.

In the side surface of the brush holding frame 16, there are formed two radially recessed hole portions 16d, which are engaged with the protrusions 22b.

With this construction, circumferential rotation of the brush holding frame 16 is restricted, and axial movement of the brush holding frame 16 is also restricted.

Otherwise, this embodiment is of the same construction as Embodiment 1.

In the motor 1 of Embodiment 3, the protrusions 22b formed on the rear bracket 10a and the hole portions 16d formed in the brush holding frame 16 are engaged with each other to restrict circumferential rotation of the brush holding frame 16 and to restrict axial movement of the brush holding frame 16. Therefore, even if the rotating commutator 13 collides with the brush holding frame 16, the positive-pole-side brushes 15a and the positive-pole-side lead wires 14a are prevented from sticking out of the brush holding frame 16, making it possible to prevent short-circuiting between the positive-pole-side brushes 15a and the positive-pole-side lead wires 14a and the motor housing 10.

While the motor 1 of the above-described embodiments is one mounted to an engine starter, this naturally should not be construed restrictively; the motor 1 may also be one mounted to some other device.

What is claimed is:

1. A motor comprising:
   a motor housing having a cover portion and a cylindrical motor housing main body;
   a stator fixed in position on an inner side of the motor housing;
   a rotor rotatably provided on an inner side of the stator;
   a commutator provided on a rotation shaft of the rotor and rotating together with the rotor;
   a positive-pole-side brush one end portion of which is in contact with the commutator and another end portion of which is connected to a positive-pole-side lead wire;
   a negative-pole-side brush one end portion of which is in contact with the commutator and another end portion of which is connected to a negative-pole-side lead wire; and
   an insulating brush holding frame fixed in position on the inner side of the motor housing and having a positive-pole-side brush holding portion holding the positive-pole-side brush and a negative-pole-side brush holding portion holding the negative-pole-side brush,
   wherein the positive-pole-side brush holding portion and the negative-pole-side brush holding portion each curve about a circumference of the commutator; and
   wherein a thickness of an outer portion of the positive-pole-side brush holding portion in a circumferential direction of the commutator is greater than a thickness of an outer portion of the negative-pole-side brush holding portion in the circumferential direction of the commutator.

2. A motor according to claim 1, wherein a thickness of the positive-pole-side brush holding portion in a direction parallel to a rotational axis of the commutator is greater than a thickness of the negative-pole-side brush holding portion in the direction parallel to the rotational axis of the commutator.

3. A motor according to claim 1, wherein an outer surface of the positive-pole-side brush holding portion, in a radial direction of the commutator, is disposed between the positive-pole-side lead wire and the motor housing.

4. A motor according to claim 1, wherein one of the motor housing, a through bolt for fixing the cover portion to the motor housing main body, and the stator has an engagement portion engaged with the brush holding frame to restrict circumferential rotation of the brush holding frame.

5. A motor according to claim 1, wherein the motor is used in an engine starter.

* * * * *